United States Patent
Ober et al.

(10) Patent No.: US 6,750,296 B2
(45) Date of Patent: Jun. 15, 2004

(54) POLYMER MATERIAL WITH STABLE NON-WETTING SURFACE

(75) Inventors: Christopher K. Ober, Ithaca, NY (US); Maoliang Xiang, Naugatuck, CT (US); Kenneth J. Wynne, Richmond, VA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 10 days.

(21) Appl. No.: 10/041,757

(22) Filed: Jan. 7, 2002

(65) Prior Publication Data

US 2002/0161147 A1 Oct. 31, 2002

Related U.S. Application Data

(60) Provisional application No. 60/259,845, filed on Jan. 5, 2001.

(51) Int. Cl.[7] .......................... C08F 20/22; C08C 19/12; C08L 27/12; C08L 27/18
(52) U.S. Cl. ....................... 525/200; 525/276; 525/280; 525/332.3; 525/359.1; 525/359.6; 526/245; 526/252; 526/254; 524/544; 524/546
(58) Field of Search ................................. 525/200, 276, 525/280, 332.3, 359.1, 359.6, 61, 71; 526/245, 252, 254; 524/544, 546

(56) References Cited

U.S. PATENT DOCUMENTS 5,907,017 A   5/1999   Ober et al. ............... 525/332.3

FOREIGN PATENT DOCUMENTS

| DE | 19910811 | 9/2000 | ......... C08F/297/00 |
| EP | 0337474 | 10/1989 | ............ C09D/3/80 |

OTHER PUBLICATIONS

Chapman, Toby.M. ,et al., "Determination of Low Critical Surface Tensions of Novel Fluorinated Poly(amide urethane) Block Copolymers. 1. Fluorinated Side Chains", *Macromolecules*, vol. 28, No. 1, (1995),331–335.

Chapman, Toby.M. , et al. ,"Determination of Low Critical Surface Tensions of Novel Fluorinated Poly(amide urethane) Block Copolymers. 2. Fluorinated Soft–Block Backbone and Side Chains", *Macromolecules*, vol. 28, No. 6, (1995),2081–2085.

Kang, Seok Ho.,et al. ,"Synthesis and Characterization of Diblock Copolymers Containing Surface Modifying Moieties for Non–Biofouling Materials", *Polymer Preprints*, vol. 41, No. 2, (Aug. 2000), 1521–1522.

Kobayashi, Hideki.,et al. ,"Surface Properties of Fluorosilicones", *Trends in Polymer Science*, vol. 3, No. 10, (Oct. 1995),330–335.

Pike, John.K.,et al. ,"Time–Dependent Dynamic Contact Angle Analysis of Poly(dimethylsiloxane–urethane–urea) Segmented Block Copolymer Films", *Polymer Preprints*, vol. 36, No. 2, (1995),67–68.

Pike, John.K. ,et al. ,"Water–Induced Surface Rearrangements of Poly(dimethylsiloxane–urea–urethane) Segmented Block Copolymer Films", *Chemistry of Materials*, vol. 8, No. 4, (Apr. 1996),856–860.

Wang, J. ,et al. ,"Liquid crystalline, semifluorinated side group block copolymers with stable low energy surfaces: synthesis; liquid crystalline structure, and critical surface tension", *Macromolecules*, vol. 30, No. 7, XP002202967, (1997),1906–1914.

Xiang, Maoliang.,et al. ,"Surface Stability in Liquid–Crystalline Block Copolymers with Semifluorinated Monodendron Side Groups", *Macromolecules*, vol. 33, No. 16, (Aug. 2000),6106–6119.

*Primary Examiner*—Rabon Sergent
*Assistant Examiner*—Olga Asinovsky
(74) *Attorney, Agent, or Firm*—Schwegman, Lundberg, Woessner & Kluth, P.A.

(57) ABSTRACT

The present invention provides block copolymers with semifluorinated LC side groups (single or monodendron groups). The block copolymers can be blended with a thermoplastic elastomer block copolymer, e.g., styrene-ethylene/butylene-styrene (SEBS) to provide a surface active block copolymer (SABC).

23 Claims, 3 Drawing Sheets

POLYMER MATERIAL WITH STABLE NON-WETTING SURFACE

RELATED APPLICATIONS

This application claims priority from U.S. Provisional Application No. 60/259,845; filed on Jan. 5, 2001, which is incorporated herein by reference.

GOVERNMENT FUNDING

The invention described herein was made with government support under Grant Number N00014-95-1-0695 awarded by the Office of Naval Research. The United States Government has certain rights in the invention.

BACKGROUND OF THE INVENTION

Environmental concern and legislation regarding toxic metal-containing anti-fouling coatings, which may create an environmental hazard and potential for pollution, has stimulated research efforts into alternative non-toxic fouling methods. Currently, silicone and fluorine containing polymers are commonly used as low surface materials. However, most of them are susceptible to physical and chemical processes in water that compromise optimum surface properties. For example, one non-toxic anti-fouling material currently in use is elastomeric poly(dimethyl siloxane) which, depending on the formulation, is susceptible to physical and chemical processes in water that compromise optimum surface properties.

Fluorinated polymers are known and are used for providing low surface energy surfaces. Such surfaces have anti-stick, non-wetting, and low friction properties. For example, fluorinated ester side chain acrylic and methacrylic polymers are low surface energy coating materials that are commercially available. In addition, low surface energy fluorinated poly(amide urethane) block copolymers and other low surface energy polymers have been reported in the literature. See, e.g., Chapman, T. M., et al., Macromolecules, 28, 331–335 (1995); Chapman, T. M., et al., Macromolecules, 28, 2081–2085 (1995); Wynne, K. J., et al., Polym. Prepr. (Am. Chem. Soc., Div. Polym. Chem.), 36(1), 67–68 (1995); and Pike, J. K., et al., Chem. Mater., 8, 856–860 (1996). However, these polymers with fluorinated side chains do not have stable low surface energy properties when immersed in water, and over time in water the low surface energy properties are reduced due to movement of polar groups to the surface to change the polarity thereof (i.e., the polymers undergo surface reconstruction).

Semifluorinated side-groups have been successfully introduced onto a block copolymer to create new controlled surface energy polymers. See, e.g., Xiang, M.; Li, X.; Ober, C. K.; Char, K.; Genzer, J.; Sivaniah, E.; Kramer, E. J.; Fischer, D. A. *Macromolecules,* 2000, 33, 6106; and Kang, S. H.; Ober, C. K.; Kramer, E. J. *Polym. Prepr.* 2000, 41(2), 1521. The attachment of the per- and semifluorinated side chains to the polymeric backbones have provided stable, low energy surfaces that resist fouling by marine organisms. Kobayashi, H.; Owen, M. J. *Trends in Polymer Science,* 1995, 3(10), 330. However, additional non-wetting, low energy materials having compatible segments are needed. The material is preferably stable (e.g., does not undergo surface reconstruction to an appreciable degree) over extended periods of time in a polar environment. The material preferably provides acceptable adhesion to a variety of surfaces and preferably has the mechanical properties needed to prevent marine biofouling typically encountered with silicone elastomers. In addition to the surface resisting biofouling, the surface of the material preferably resists heterogeneous nucleation of ice and the adsorption of proteins. In addition, the surface of the material is preferably biocompatible.

SUMMARY OF THE INVENTION

The present invention provides block copolymers with semifluorinated LC side groups (single or monodendron groups). The block copolymers can be blended with a thermoplastic elastomer block copolymer, e.g., styrene-ethylene/butylene-styrene (SEBS) to provide a surface active block copolymer (SABC). The surface active block copolymer (SABC) has a surface energy of about 8 mN/m to about 20 mN/m and a water contact angle of about 100 degrees to about 150 degrees. The surface active block copolymer (SABC) is useful in the manufacture of anti-fouling coatings and low energy surface materials. The surface active block copolymer (SABC) is non-toxic, does not undergo surface reconstruction when immersed in a polar environment, possesses anti-stick properties, possesses non-wetting properties, possesses low friction properties, resists biofouling by marine organisms, exhibits minimal protein adsorption, resists heterogeneous nucleation of ice, and/or is biocompatible.

The present invention provides a compound of formula (I):

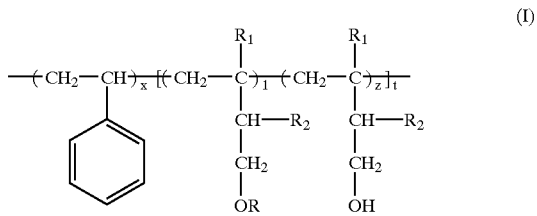

wherein
$R^1$ is hydrogen and $R^2$ is methyl or $R^1$ is methyl and $R^2$ is hydrogen;
x is about 100 to about 5,000;
z is about 20 to about 1,000;
l is about 20 to about 1,000;
t is about 40 to about 2,000; and
R is a compound of formula (II) or (III):

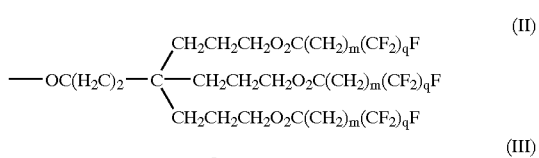

wherein
m is 0 to about 15; and
q is about 5 to about 15.
Specifically, x can be about 500 to about 1,000; z can be about 200 to about 500; l can be about 200 to about 500; t can be about 200 to about 1,000; m can be about 4 to about 10; and q can be about 6 to about 12. The compound of formula (I) can have an average molecular weight of about 10,000 to about 500,000 or about 75,000 to about 150,000. The compound of formula (I) can be blended with a thermoplastic elastomer block copolymer, e.g., styrene-ethylene/butylene-styrene (SEBS).

The present invention also provides a compound of formula (IV):

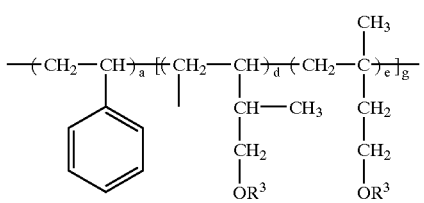

wherein a is about 200 to about 5,000;

d is about 100 to about 500;

e is about 100 to about 500;

g is about 200 to about 1,000;

$R^3$ is a compound of formula (V):

wherein j is about 1 to about 15.

Specifically, a can be about 150 to about 3,000; d can be about 100 to about 300; e can be about 100 to about 300; g can be about 200 to about 600; and j can be about 6 to about 8. The compound of formula (IV) can have an average molecular weight of about 10,000 to about 500,000 or about 50,000 to about 150,000. The compound of formula (IV) can be blended with a thermoplastic elastomer block copolymer, e.g., styrene-ethylene/butylene-styrene (SEBS).

The present invention also provides a surface active block copolymer (SABC) comprising a thermoplastic elastomer block copolymer and a diblock copolymer, wherein the diblock copolymer comprises semifluorinated monodendron side chains. The thermoplastic elastomer block copolymer can be styrene-ethylene/butylene-styrene (SEBS). The surface active block copolymer (SABC) can have a surface energy of about 8 mN/m to about 20 mN/m. The surface active block copolymer (SABC) can have a water contact angle of about 100 degrees to about 150 degrees. The thermoplastic elastomer block copolymer can be present in about 1 wt. % to about 20 wt. % of the surface active block copolymer (SABC). The diblock copolymer can be present in about 2 wt. % to about 5 wt. % of the surface active block copolymer (SABC). The diblock copolymer can be a compound of formula (I). The surface active block copolymer (SABC) can be useful in the manufacture of an anti-fouling coating, a low energy surface material, or a combination thereof. The surface active block copolymer (SABC) can have suitable physical properties, e.g., non-toxic, does not undergo surface reconstruction when immersed in a polar environment, possesses anti-stick properties, possesses non-wetting properties, possesses low friction properties, resists biofouling by marine organisms, exhibits minimal protein adsorption, resists heterogeneous nucleation of ice, is biocompatible, or any combination thereof.

The present invention also provides surface active block copolymer (SABC) comprising a thermoplastic elastomer block copolymer and a diblock copolymer, wherein the diblock copolymer comprises oligoethylene glycol side chains. The thermoplastic elastomer block copolymer can be styrene-ethylene/butylene-styrene (SEBS). The surface active block copolymer (SABC) can have a surface energy of about 40 mN/m to about 60 mN/m. The surface active block copolymer (SABC) can have a water contact angle of about 25 degrees to about 60 degrees. The thermoplastic elastomer block copolymer can be present in about 80 wt. % to about 99 wt. % of the surface active block copolymer (SABC). The diblock copolymer can be present in about 2 wt. % to about 5 wt. % of the surface active block copolymer (SABC). The diblock copolymer can be a compound of formula (IV). The surface active block copolymer (SABC) can be useful in the manufacture of an anti-fouling coating, a low energy surface material, or a combination thereof. The surface active block copolymer (SABC) can have suitable physical properties, e.g., non-toxic, does not undergo surface reconstruction when immersed in a polar environment, possesses anti-stick properties, possesses non-wetting properties, possesses low friction properties, resists biofouling by marine organisms, exhibits minimal protein adsorption, resists heterogeneous nucleation of ice, is biocompatible, or any combination thereof.

The present invention also provides a method for forming a surface active block copolymer (SABC) comprising blending an effective amount of a thermoplastic elastomer block copolymer and an effective amount of a diblock copolymer, wherein the diblock copolymer comprises semifluorinated monodendron side chains. The thermoplastic elastomer block copolymer can be styrene-ethylene/butylene-styrene (SEBS). The diblock copolymer can be a compound of formula (I).

The present invention also provides a method for forming a surface active block copolymer (SABC) comprising blending an effective amount of a thermoplastic elastomer block copolymer and an effective amount of a diblock copolymer, wherein the diblock copolymer comprises oligoethylene glycol side chains. The thermoplastic elastomer block copolymer can be styrene-ethylene/butylene-styrene (SEBS). The diblock copolymer can be a compound of formula (IV).

DETAILED DESCRIPTION OF THE INVENTION

Figure 1:
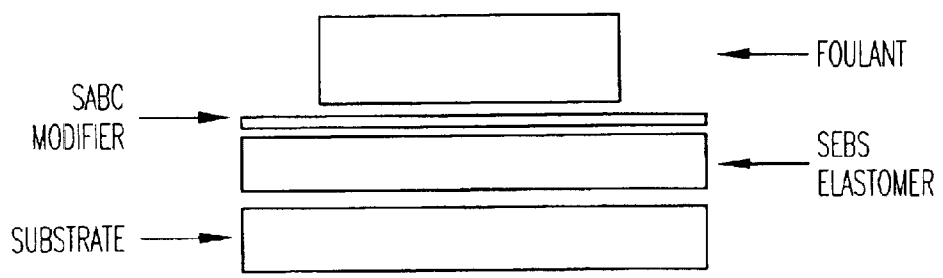
FIG. 1 illustrates a bilayer approach to antifouling/fouling resistant surfaces using Kraton™ styrene ethylene/butadiene styrene (SEBS) primer layer and surface active block copolymer (SABC) top layer.

It will be appreciated by those skilled in the art that compounds of the invention having a chiral center may exist in and be isolated in optically active and racemic forms. Some compounds may exhibit polymorphism. It is to be understood that the present invention encompasses any racemic, optically-active, polymorphic, or stereoisomeric form, or mixtures thereof, of a compound of the invention, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase).

Specific and preferred values listed below for radicals, substituents, and ranges, are for illustration only; they do not exclude other defined values or other values within defined ranges for the radicals and substituents A specific value for x is about 500 to about 1,000.
A specific value for z is about 200 to about 500.
A specific value for l is about 200 to about 500.
A specific value for t is about 200 to about 1,000.
A specific value for m is about 4 to about 10.
A specific value for q is about 6 to about 12.

A specific compound is a compound of formula (I) wherein x is about 500 to about 1,000; z is about 200 to about 500; l about 200 to about 500; t is about 200 to about 1,000; m is about 4 to about 10; and q is about 6 to about 12.

A specific compound is a compound of formula (I) that has an average molecular weight of about 10,000 to about 500,000. More specifically, the compound has an average molecular weight of about 75,000 to about 150,000.

Specifically, the compound of formula (I) can be blended with a thermoplastic elastomer block copolymer. Specifically, the thermoplastic elastomer block copolymer can be any rubbery block copolymer, such as those that include styrene domains. Suitable thermoplastic elastomer block copolymers include styrene-ethylene/butylene-styrene (SEBS). One preferred thermoplastic elastomer block copolymer is commercially available as Krayton® by Shell Chemical Company.

A specific value for a is about 150 to about 3,000.
A specific value for d is about 100 to about 300.
A specific value for e is about 100 to about 300.
A specific value for g is about 200 to about 600.
A specific value for j is about 6 to about 8.

A specific compound is a compound of formula (IV) wherein a is about 150 to about 3,000; d is about 100 to about 300; e is about 100 to about 300; g is about 200 to about 600; and j is about 6 to about 8.

A specific compound is a compound of formula (IV) that has an average molecular weight of about 10,000 to about 500,000. More specifically, the compound has an average molecular weight of about 50,000 to about 150,000.

Specifically, the compound of formula (IV) can be blended with a thermoplastic elastomer block copolymer. Specifically, the thermoplastic elastomer block copolymer can be any rubbery block copolymer, such as those that include styrene domains. Suitable thermoplastic elastomer block copolymers include styrene-ethylene/butylene-styrene (SEBS). One preferred thermoplastic elastomer block copolymer is commercially available as Krayton® by Shell Chemical Company.

Specifically, when the diblock copolymer comprises semifluorinated monodendron side chains, the surface active block copolymer (SABC) can have a surface energy of about 8 mN/m to about 20 mN/m. When the diblock copolymer comprises oligoethylene glycol side chains, the surface active block copolymer (SABC) can have a surface energy of about 40 mN/m to about 60 mN/m.

Specifically, when the diblock copolymer comprises semifluorinated monodendron side chains, the surface active block copolymer (SABC) can have a water contact angle of about 100 degrees to about 150 degrees. When the diblock copolymer comprises oligoethylene glycol side chains, the surface active block copolymer (SABC) of claim 12 that has a water contact angle of about 25 degrees to about 60 degrees.

Specifically, when the diblock copolymer comprises semifluorinated monodendron side chains, the thermoplastic elastomer block copolymer can be present in about 1 wt. % to about 20 wt. % of the surface active block copolymer (SABC). When the diblock copolymer comprises oligoethylene glycol side chains, the thermoplastic elastomer block copolymer can be present in about 80 wt. % to about 99 wt. % of the surface active block copolymer (SABC).

Specifically, when the diblock copolymer comprises semifluorinated monodendron side chains, the diblock copolymer can be present in about 2 wt. % to about 5 wt. % of the surface active block copolymer (SABC). When the diblock copolymer comprises oligoethylene glycol side chains, the diblock copolymer can be present in about 2 wt. % to about 5 wt. % of the surface active block copolymer (SABC).

Specifically, when the diblock copolymer comprises semifluorinated monodendron side chains, the diblock copolymer can be a compound of formula (I). When the diblock copolymer comprises oligoethylene glycol side chains, the diblock copolymer can be a compound of formula (IV).

Specifically, the surface active block copolymer (SABC) can be useful in the manufacture of an anti-fouling coating, a low energy surface material, or a combination thereof.

Specifically, the surface active block copolymer (SABC) can be useful in the manufacture of blood clotting devices, chromatographic supports, contact lenses, and immunoassay systems.

Specifically, the surface active block copolymer (SABC) can be non-toxic, will not undergo surface reconstruction when immersed in a polar environment, possesses anti-stick properties, possesses non-wetting properties, possesses low friction properties, resists biofouling by marine organisms, exhibits minimal protein adsorption, resists heterogeneous nucleation of ice, is biocompatible, or any combination thereof.

In cases where compounds (e.g., starting materials) are sufficiently basic or acidic to form stable nontoxic acid or base salts, the compounds can exist as the acceptable salt. Examples of acceptable salts are organic acid addition salts formed with acids which form an acceptable anion, for example, tosylate, methanesulfonate, acetate, citrate, malonate, tartarate, succinate, benzoate, ascorbate, α-ketoglutarate, and α-glycerophosphate. Suitable inorganic salts may also exist, including hydrochloride, sulfate, nitrate, bicarbonate, and carbonate salts.

Acceptable salts may be obtained by using standard procedures that are well known in the art, for example by reacting a sufficiently basic compound such as an amine with a suitable acid affording an acceptable anion. Alkali metal (for example, sodium, potassium or lithium) or alkaline earth metal (for example calcium) salts of carboxylic acids can also be made.

Processes for preparing the compounds and surface active block copolymers (SABC) of the present invention are provided as further embodiments of the invention. Following a procedure described in Wang, J.-G.; Mao, G.-P.; Ober, C. K.; Kramer, E. J. *Macromolecules,* 1997, 30, 1906., block copolymers of polystyrene and 1,2- or 3,4-polyisoprene were synthesized. The attachment of oligoethylene glycol side groups was carried out by formation of ester from the hydroxy groups and the oligoethylene glycol acid chloride. Acid chlorides were used to increase conversion and shorten reaction time. Additional compounds and materials containing such compounds (e.g., block copolymers), exemplary processes for preparing the compounds and the materials containing such compounds useful in the present invention, as well as examples demonstrating the utility of such compounds and materials containing such compounds are disclosed in pages 14 to 79, which are incorporated herein as part of the present invention.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

EXAMPLES

Example 1

Synthesis of PEG4

Figure 3:
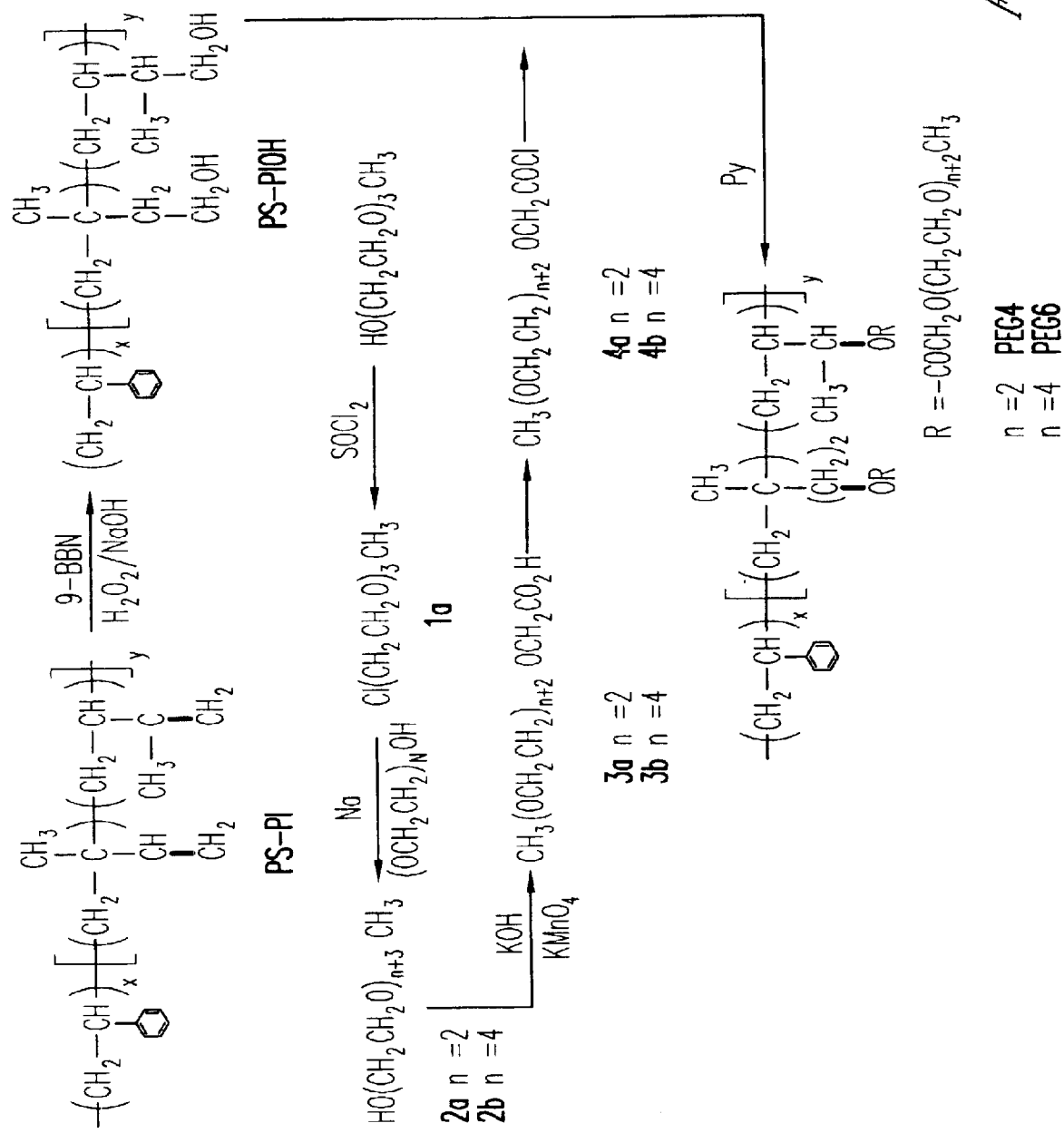
FIG. 3 illustrates a synthesis of representative compounds of the present invention.
Figure 4:
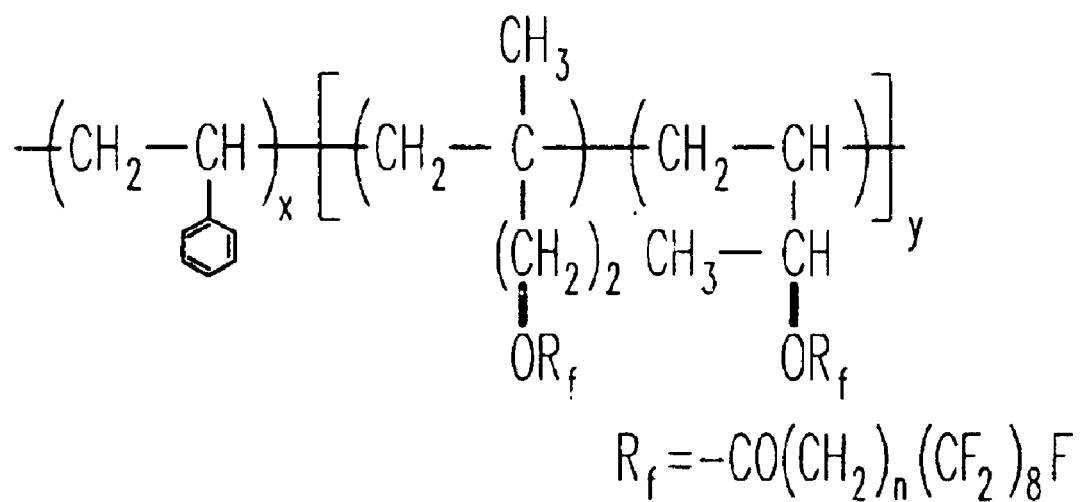
FIG. 4 illustrates representative compounds of the present invention.

0.1 g (0.268 mmol hydroxyl groups) of the hydroxylated Poly(styrene-b-isoprene) block copolymer was dissolved in 2 mL anhydrous THF and 0.5 mL anhydrous pyridine. After dropwise addition of 0.114 g (0.402 mmol) of 4a in 2 mL anhydrous THF, the solution was stirred at 50° C. for 24 h. The solution was then poured into 150 mL of water and the resultant precipitate was filtered and subsequently washed with water. The polymer was dried overnight at 50° C. in vacuum oven (FIG. 3).

Example 2

Synthesis of PEG6

0.2 g (0.536 mmol hydroxyl groups) of the hydroxylated Poly(styrene-b-isoprene) block copolymer was dissolved in 4 mL anhydrous THF and 1 mL anhydrous pyridine. After dropwise addition of 0.220 g (0.618 mmol) of 4b in 4 mL anhydrous THF, the solution was stirred at 50° C. for 24 h. The solution was then poured into 250 mL of water and the resultant precipitate was filtered and subsequently washed with water. The polymer was dried overnight at 50° C. in vacuum oven (FIG. 3).

Example 3

Preparation of PEG4/SEBS Bi-layer Coating

The bi-layer coating was prepared by spin-coating a 0.5 wt % THF polymer solution of PEG4 onto a bottom layer of SEBS (styrene-ethylene-butadiene thermoplastic elastomer) and annealed under vacuum at 120° C. for 15 hours. The SEBS bottom layer was prepared by spin-coating a 2 wt % toluene solution onto a rectangular glass cover slide (length 4 cm, diameter=1 cm) and dried under vacuum at 80° C. for 24 hours (FIG. 1).

Example 4

Preparation of PEG6/SEBS Bi-layer Coating

The bi-layer coating was prepared by spin-coating a 0.5 wt % THF polymer solution of PEG6 onto a bottom layer of SEBS (styrene-ethylene-butadiene thermoplastic elastomer) and annealed under vacuum at 120° C. for 15 hours. The SEBS bottom layer was prepared by spin-coating a 2 wt % toluene solution onto a rectangular glass cover slide (length=4 cm, diameter=1 cm) and dried under vacuum at 80° C. for 24 hours.

Example 5

Preparation of F8H4/SEBS Bi-layer Coating

The bi-layer coating was prepared by spin-coating a 0.5 wt % trifluorotoluene polymer solution of F8H4 onto a bottom layer of SEBS (styrene-ethylene-butadiene thermoplastic elastomer) and annealed under vacuum at 120° C. for 15 hours. The SEBS bottom layer was prepared by spin-coating a 2 wt % toluene solution onto a rectangular glass cover slide (length=4 cm, diameter=1 cm) and dried under vacuum at 80° C. for 24 hours.

Example 6

Preparation of F8H6/SEBS Bi-layer Coating

The bi-layer coating was prepared by spin-coating a 0.5 wt % trifluorotoluene polymer solution of F8H6 onto a bottom layer of SEBS (styrene-ethylene-butadiene thermoplastic elastomer) and annealed under vacuum at 120° C. for 15 hours. The SEBS bottom layer was prepared by spin-coating a 2 wt % toluene solution onto a rectangular glass cover slide (length=4 cm, diameter=1 cm) and dried under vacuum at 80° C. for 24 hours.

Example 7

Amphora Biofouling Test of PEG4/SEBS and PEG6/SEBS: Cell Settlement and Biofilm Adhesion Strength Determination In the cell settlement experiments, Amphora cells cultured in F/2 medium, were washed 3 times in artificial sea water (TM) to remove traces of medium and secondary metabolites before dilution with sea water to give a suspension of cells with Chlorophyll with a content of approximately 0.3 $\mu gml^{-1}$. Cells were settled in individual dishes containing 10 ml of suspension at ~20° C. After 5 h the slides were gently washed in sea water to remove cells which had not properly attached. The density of cells attached to the surface was counted on each slide using an image analysis system attached to a fluorescent microscope. Counts were made for 30 fields of view (each 0.064 $mm^2$) on each of 3 replicate slides. In the adhesion strength determination experiments, slides settled with Amphora were exposed to shear in a water channel. Glass standards were included. The number of cells remaining attached was compared with unexposed control slides (used to determine settlement as above). Cells were counted using the image analysis system as described above.

Figure 2:
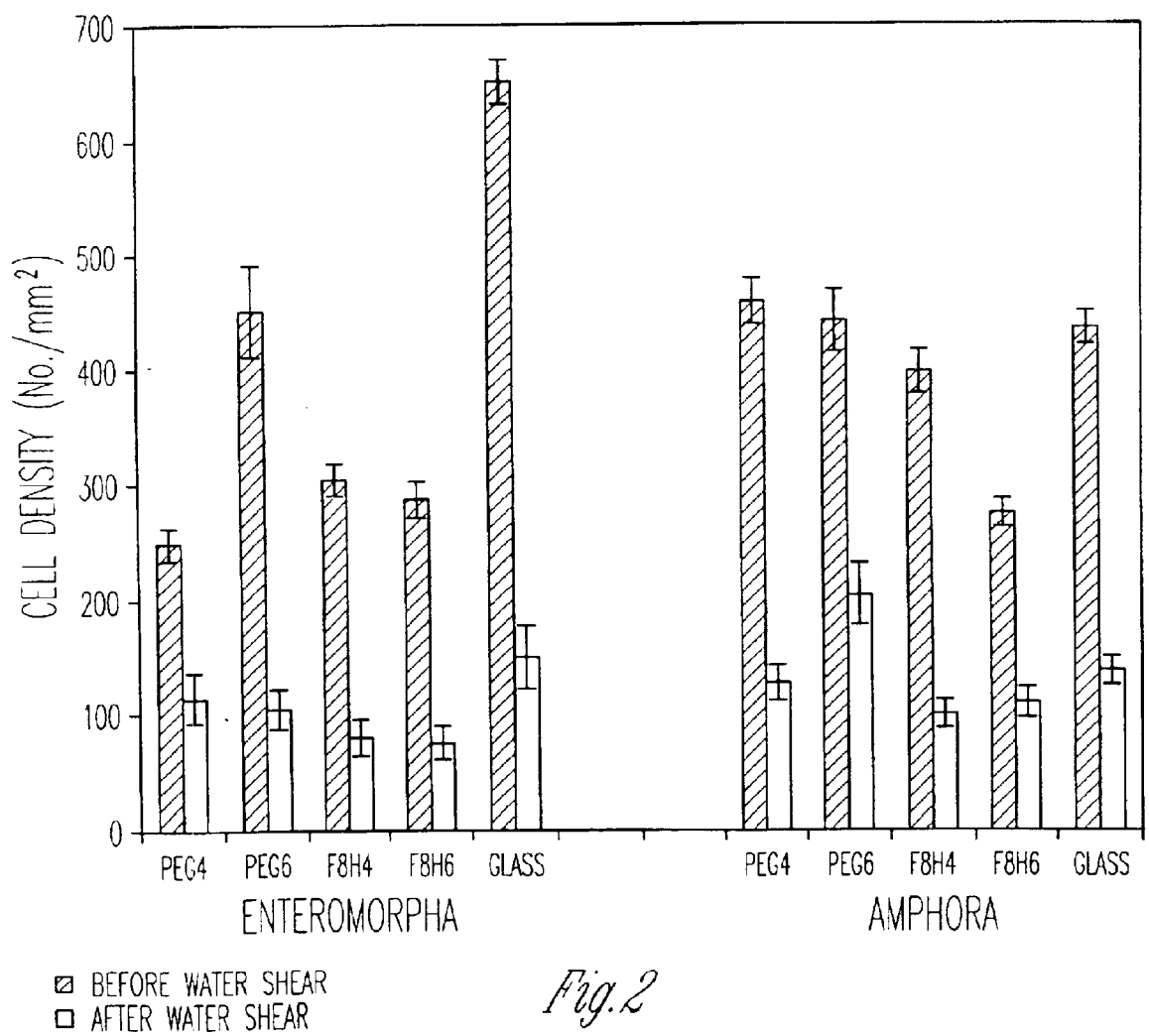
FIG. 2 illustrates Marine settlement (before water shear) and release (after water shear) of the *Enteromorpha zoospore* and the diatom Amphora for styrene-ethylene/butadiene-styrene/surface active block copolymer (SEBS/SABC) bilayer coatings on glass. Error bars represent 95% confidence limits.

Settlement results are shown in FIG. 2 (before water shear). PEG4/SEBS and PEG6/SEBS coatings showed no difference in the attachment behavior of Amphora and differed little from the glass standard. The properties of the PEGylated surfaces in terms of fouling release were also comparable to the glass standard, as shown in FIG. 2 (after water shear).

Example 8

Enteromorpha Biofouling Test of PEG4/SEBS and PEG6/SEBS: Cell Settlement and Biofilm Adhesion Strength Determination Enteromorpha cells were used in settlement and adhesion strength determination experiments as described in Example 6. PEG4/SEBS and PEG6/SEBS coatings showed a lower cell settlement, as well as an easier fouling release than the glass standard. Settlement and adhesion strength results are shown in FIG. 2, before and after water shear respectively.

Example 9

Amphora Biofouling Test of F8H4/SEBS and F8H6/SEBS: Cell Settlement and Biofilm Adhesion Strength Determination Amphora cells were used in settlement and adhesion strength determination experiments as described in Example 6. F8H4/SEBS and F8H6/SEBS coatings showed an improved behavior with respect to the PEGylated coatings, as well as a lower cell settlement and an easier fouling release than the glass standard. Settlement and adhesion strength results are shown in FIG. 2, before and after water shear respectively.

Example 10

Enteromorpha Biofouling Test of F8H4/SEBS and F8H6/SEBS: Cell Settlement and Biofilm Adhesion Strength Determination Enteromorpha cells were used in settlement and adhesion strength determination experiments as described in Example 6. F8H4/SEBS and F8H6/SEBS coatings showed an improved behavior with respect to the PEGylated coatings, as well as a lower cell settlement and an easier fouling release than the glass standard. Settlement and adhesion strength results are shown in FIG. 2, before and after water shear respectively.

Example 11

Characterization Data of Block Copolymers

TABLE 1

Characterization data of block copolymers

| Sample | $M_n{}^a$ (kg/mol) | $M_w/M_n{}^a$ | % Side chain modification[b] | Block Length Ratio[a] |
|---|---|---|---|---|
| PS-b-PI | 25 | 1.05 | 0 | 24.4K/2.9K |
| PS-b-PIOH | 28 | 1.06 | 100 | 24.4K/3.6K |
| PEG4 | 31 | 1.07 | 99 | 24K/14K |
| PEG6 | 29 | 1.08 | 89 | 24K/18K |
| F8H4 | 36 | 1.08 | 90 | 25K/25K |
| F8H6 | 37 | 1.09 | 90 | 25K/27K |

[a]Determined by GPC in THF.
[b]Determined by $^1$H-NMR.

What is claimed is:

1. A compound of formula (I):

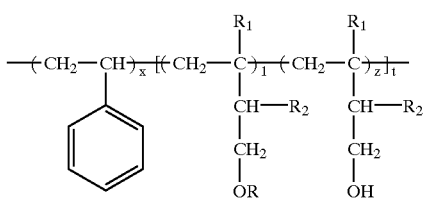

wherein

R$^1$ is hydrogen and R$^2$ is methyl or R$^1$ is methyl and R$^2$ is hydrogen;

x is about 100 to about 5,000;

z is about 20 to about 1,000;

l is about 20 to about 1,000;

t is about 200 to about 1000; and

R is a compound of formula (II) or (III):

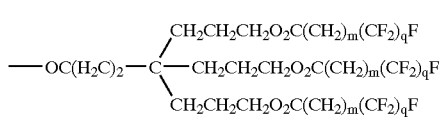

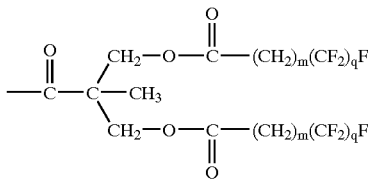

wherein m is 0 to about 15; and q is about 5 to about 15.

2. The compound of claim 1 wherein x is about 500 to about 1,000.

3. The compound of claim 1 wherein z is about 200 to about 500.

4. The compound of claim 1 wherein l is about 200 to about 500.

5. The compound of claim 1 wherein m is about 4 to about 10.

6. The compound of claim 1 wherein q is about 6 to about 12.

7. The compound of claim 1 wherein x is about 500 to about 1,000; z is about 200 to about 500; l about 200 to about 500; t is about 200 to about 1,000; m is about 4 to about 10; and q is about 6 to about 12.

8. The compound of claim 1 having an average molecular weight of about 10,000 to about 500,000.

9. The compound of claim 1 having an average molecular weight of about 75,000 to about 150,000.

10. The compound of claim 1 that is blended with a thermoplastic elastomer block copolymer.

11. The compound of claim 10, wherein the thermoplastic elastomer block copolymer is styrene-ethylene/butylene-styrene (SEBS).

12. A compound of formula (I):

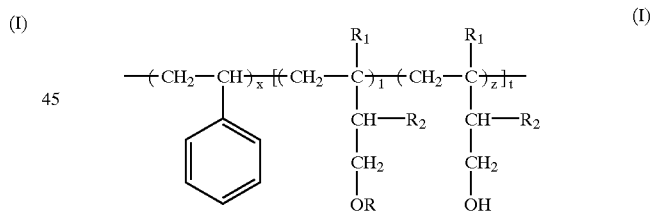

wherein

R$^1$ is hydrogen and R$^2$ is methyl or R$^1$ is methyl and R$^2$ is hydrogen;

x is about 100 to about 5,000;

z is about 200 to about 500;

l is about 20 to about 1,000;

t is about 200 to about 1,000; and

R is a compound of formula (II) or (III):

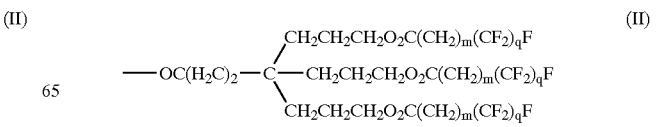

-continued

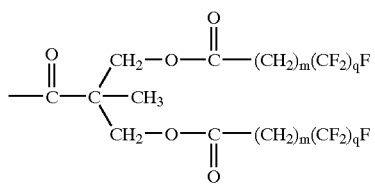
(III)

wherein
m is 0 to about 15; and
q is about 5 to about 15.

13. The compound of claim 12 wherein x is about 500 to about 1,000.

14. The compound of claim 12 wherein m is about 4 to about 10.

15. The compound of claim 12 wherein q is about 6 to about 12.

16. The compound of claim 12 that is blended with a thermoplastic elastomer block copolymer.

17. The compound of claim 16 wherein the thermoplastic elastomer block copolymer is styrene-ethylene/butylene-styrene (SEBS).

18. A compound of formula (I):

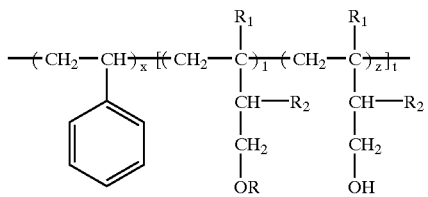
(I)

wherein
$R^1$ is hydrogen and $R^2$ is methyl or $R^1$ is methyl and $R^2$ is hydrogen;

x is about 100 to about 5,000;
z is about 20 to about 1,000;
l is about 200 to about 500;
t is about 200 to about 1,000; and
R is a compound of formula (II) or (III):

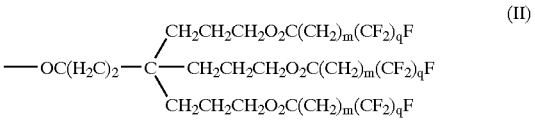
(II)

(III)

wherein
m is 0 to about 15; and
q is about 5 to about 15.

19. The compound of claim 18 wherein x is about 500 to about 1,000.

20. The compound of claim 18 wherein m is about 4 to about 10.

21. The compound of claim 18 wherein q is about 6 to about 12.

22. The compound of claim 18 that is blended with a thermoplastic elastomer block copolymer.

23. The compound of claim 22 wherein the thermoplastic elastomer block copolymer is styrene-ethylene/butylene-styrene (SEBS).

* * * * *